US008826884B2

(12) United States Patent
Kang et al.

(10) Patent No.: US 8,826,884 B2
(45) Date of Patent: Sep. 9, 2014

(54) COMBUSTION BALANCING CONTROL STRATEGY USING NORMALIZED INSTANTANEOUS HEAT RELEASE IN HCCI ENGINES

(75) Inventors: Jun-Mo Kang, Ann Arbor, MI (US); Chen-Fang Chang, Troy, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 423 days.

(21) Appl. No.: 12/915,136

(22) Filed: Oct. 29, 2010

(65) Prior Publication Data
US 2012/0103304 A1  May 3, 2012

(51) Int. Cl.
*F02B 5/00* (2006.01)
*F02D 41/30* (2006.01)
*F02D 41/00* (2006.01)

(52) U.S. Cl.
CPC ........... *F02D 41/3041* (2013.01); *Y02T 10/128* (2013.01); *F02D 34/023* (2013.01); *F02D 41/008* (2013.01)
USPC ............................. 123/305; 123/435; 701/101

(58) Field of Classification Search
CPC ............. F02D 41/008; F02D 41/0085; F02D 41/3041; F02D 41/3035; F02D 35/023; F02D 35/028; F02D 35/02; Y02T 10/128
USPC ........ 123/27 R, 316, 435, 436, 676; 701/102, 701/103, 104, 111; 73/114.13, 114.15, 73/114.16, 114.27
See application file for complete search history.

(56) References Cited

U.S. PATENT DOCUMENTS

| | | | | |
|---|---|---|---|---|
| 6,619,255 | B2 * | 9/2003 | Urushihara et al. | 123/295 |
| 6,651,677 | B2 * | 11/2003 | Sukegawa et al. | 123/305 |
| 7,367,308 | B2 | 5/2008 | Kuo et al. | |
| 7,370,616 | B2 | 5/2008 | Kuo et al. | |
| 7,370,633 | B2 | 5/2008 | Kang et al. | |
| 7,506,535 | B2 * | 3/2009 | Kang | 73/114.16 |
| 7,739,999 | B2 | 6/2010 | Kang et al. | |
| 2002/0195086 | A1 * | 12/2002 | Beck et al. | 123/435 |
| 2007/0245982 | A1 * | 10/2007 | Sturman | 123/26 |
| 2008/0178843 | A1 * | 7/2008 | Duffy et al. | 123/435 |

* cited by examiner

*Primary Examiner* — Thomas Moulis
*Assistant Examiner* — Elizabeth Hadley

(57) ABSTRACT

A method for controlling combustion in a multi-cylinder internal combustion engine operating in a controlled auto-ignition mode includes providing combustion control parameters, determining peak cylinder pressures and crank angle location of the peak cylinder pressures. Cylinder volumes at the peak cylinder pressures and at intake valve closings are determined and cylinder pressures at intake valve closings are determined. A combustion parameter for each cylinder is calculated based upon the peak cylinder pressure, the cylinder pressure at the intake valve closing, the crank angle location of the peak cylinder pressure, the cylinder volume coincident with the peak cylinder pressure, and the cylinder volume at the intake valve closing. A target combustion parameter is determined and the calculated combustion parameter for each cylinder is compared to the target combustion parameter. The provided combustion control parameters for each cylinder are adjusted to balance the combustion parameter across all cylinders based on the comparison. The engine is controlled based on the adjusted provided combustion control parameters.

17 Claims, 4 Drawing Sheets

COMBUSTION BALANCING CONTROL STRATEGY USING NORMALIZED INSTANTANEOUS HEAT RELEASE IN HCCI ENGINES

TECHNICAL FIELD

This disclosure relates to operation and control of homogeneous-charge compression-ignition (HCCI) engines.

BACKGROUND

The statements in this section merely provide background information related to the present disclosure and may not constitute prior art.

Internal combustion engines, especially automotive internal combustion engines, generally fall into one of two categories: spark ignition and compression ignition. Spark ignition engines, such as gasoline engines, introduce a fuel/air mixture into the combustion cylinders, which is then compressed in the compression stroke and ignited by a spark plug. Compression ignition engines, such as diesel engines, introduce or inject pressurized fuel into a combustion cylinder near top dead center (TDC) of the compression stroke, which ignites upon injection. Combustion for both gasoline engines and diesel engines involves premixed or diffusion flames that are controlled by fluid mechanics. Each type of engine has advantages and disadvantages. In general, gasoline engines produce fewer emissions but are less efficient. In general, diesel engines are more efficient but produce more emissions.

Other types of combustion technologies have been introduced for internal combustion engines. One such technology is known in the art as the homogeneous charge compression ignition (HCCI). The HCCI combustion mode includes a distributed, flameless, auto-ignition combustion process that is controlled by oxidation chemistry, rather than by fluid mechanics. In a typical engine operating in the controlled auto-ignition combustion mode, the intake charge is nearly homogeneous in composition, temperature, and residual level at intake valve closing time. Because controlled auto-ignition is a distributed kinetically-controlled combustion process, the engine operates at a very dilute fuel/air mixture (i.e., lean of a fuel/air stoichiometric point) and has a relatively low peak combustion temperature, thus forming extremely low $NO_x$ emissions. The fuel/air mixture for controlled auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the controlled auto-ignition mode can operate unthrottled to achieve diesel-like fuel economy.

At medium engine speed and load operation, a combination of valve timing strategy and exhaust rebreathing (the use of exhaust gas to heat the cylinder charge entering a combustion space in order to encourage auto-ignition) during the intake stroke has been found to be very effective in providing adequate heating to the cylinder charge so that auto-ignition during the compression stroke leads to stable combustion with low noise. This method, however, does not work satisfactorily at or near idle speed and load conditions. As the idle speed and load is approached from a medium speed and load condition, the exhaust temperature decreases. At near idle speed and load there is insufficient heat energy in the rebreathed exhaust to produce reliable auto-ignition. As a result, at the idle condition, the cycle-to-cycle variability of the combustion process is too high to allow stable combustion when operating in the HCCI mode. Consequently, one of the main issues in effectively operating an HCCI engine has been to control the combustion process properly so that robust and stable combustion resulting in low emissions, optimal heat release rate, and low noise can be achieved over a range of operating conditions. The benefits of HCCI combustion have been known for many years. The primary barrier to product implementation, however, has been the challenges of directly controlling the HCCI combustion process.

The HCCI engine is able to transition between operating in an auto-ignited combustion mode at part-load and lower engine speed conditions and in a conventional spark-ignited combustion mode at high load and high speed conditions. These two combustion modes require different engine operation to maintain robust combustion. For instance, in the auto-ignited combustion mode, the engine operates at lean air-fuel ratios with the throttle fully open to minimize engine pumping losses. In contrast, in the spark-ignition combustion mode, the throttle is controlled to restrict intake airflow and the engine is operated in at a stoichiometric air-fuel ratio.

In the typical HCCI engine, engine air flow is controlled by adjusting an intake throttle position, or adjusting opening and closing of intake valves and exhaust valves, using a variable valve actuation (VVA) system that includes a selectable multi-step valve lift, e.g., multiple-step cam lobes which provide two or more valve lift profiles. There is a need to have a smooth transition between these two combustion modes during ongoing engine operation, in order to prevent engine misfires or partial-burns during the transitions.

The combustion process in an HCCI engine depends strongly on factors such as cylinder charge composition, temperature, and pressure at the intake valve closing. Hence, the control inputs to the engine, for example, fuel mass and injection timing and intake/exhaust valve profile, must be carefully coordinated to ensure robust auto-ignition combustion. Generally speaking, for best fuel economy, an HCCI engine operates unthrottled and with a lean air-fuel mixture. Further, in an HCCI engine using exhaust recompression valve strategy, the cylinder charge temperature is controlled by trapping different amount of the hot residual gas from the previous cycle by varying the exhaust valve close timing. Typically, the HCCI engine is equipped with one or more cylinder pressure sensors and a cylinder pressure processing unit which samples cylinder pressure from the sensor and calculates the combustion parameters such as CA50 (location of 50% fuel mass burn), IMEP, and, NMEP, among other. The objective of HCCI combustion control is to maintain desired combustion phasing, indicated by CA50, by adjusting multiple inputs such as intake and exhaust valve timings, throttle position, EGR valve opening, injection timing, etc., in real-time. Thus, the cylinder pressure processing unit generally employs expensive, high-performance Digital Signal Processing (DSP) chips to process the vast amount of cylinder pressure samples to generate combustion parameters in real-time.

In an HCCI engine with multiple cylinders, combustion timing for each cylinder can vary significantly due to differences in the intake and thermal boundary conditions of each cylinder. It is known for a single cylinder engine, that adjusting both negative valve overlap (NVO) and combustion control parameters such as injection mass and timing, split fuel injection, spark timing, throttle and EGR valve positions combustion phasing control and robust HCCI combustion can be achieved using either a fully flexible valve actuation (FFVA) system or a simplified mechanical two-step with equal cam phasing. However, for multi-cylinder engines, throttle and EGR valve positions have global effects on combustion phasing for all cylinders, therefore, such combustion control parameters cannot be used for individual combustion phasing control. Likewise, a multi-cylinder engine equipped only with a conventional mechanical cam phasing system results in the same NVO applied to all cylinders and the capability of individual cylinder NVO control for combustion phasing is also not feasible.

SUMMARY

A method for controlling combustion in a multi-cylinder internal combustion engine operating in a controlled auto-ignition mode includes providing combustion control parameters, determining a respective peak cylinder pressure and a respective crank angle location of the peak cylinder pressure for each cylinder during each combustion cycle, determining a respective cylinder volume at the respective crank angle location of the peak cylinder pressure for each cylinder during each combustion cycle, determining a respective cylinder pressure at a respective intake valve closing for each cylinder during each combustion cycle, and determining a respective cylinder volume at the respective intake valve closing for each cylinder during each combustion cycle. A combustion parameter for each cylinder is calculated based upon the respective peak cylinder pressure, the respective cylinder pressure at the respective intake valve closing, the respective crank angle location of the respective peak cylinder pressure, the respective cylinder volume at the respective crank angle location of the peak cylinder pressure, and the respective cylinder volume at the respective intake valve closing. A target combustion parameter is determined based upon the provided combustion control parameters and the calculated combustion parameters for each cylinder. The calculated combustion parameter for each cylinder is compared to the target combustion parameter and the provided combustion control parameters for each cylinder are adjusted to balance the combustion parameter across all cylinders based on the comparison. The engine is controlled based on the adjusted provided combustion control parameters.

BRIEF DESCRIPTION OF THE DRAWINGS

One or more embodiments will now be described, by way of example, with reference to the accompanying drawings, in which.

DETAILED DESCRIPTION

Figure 1:
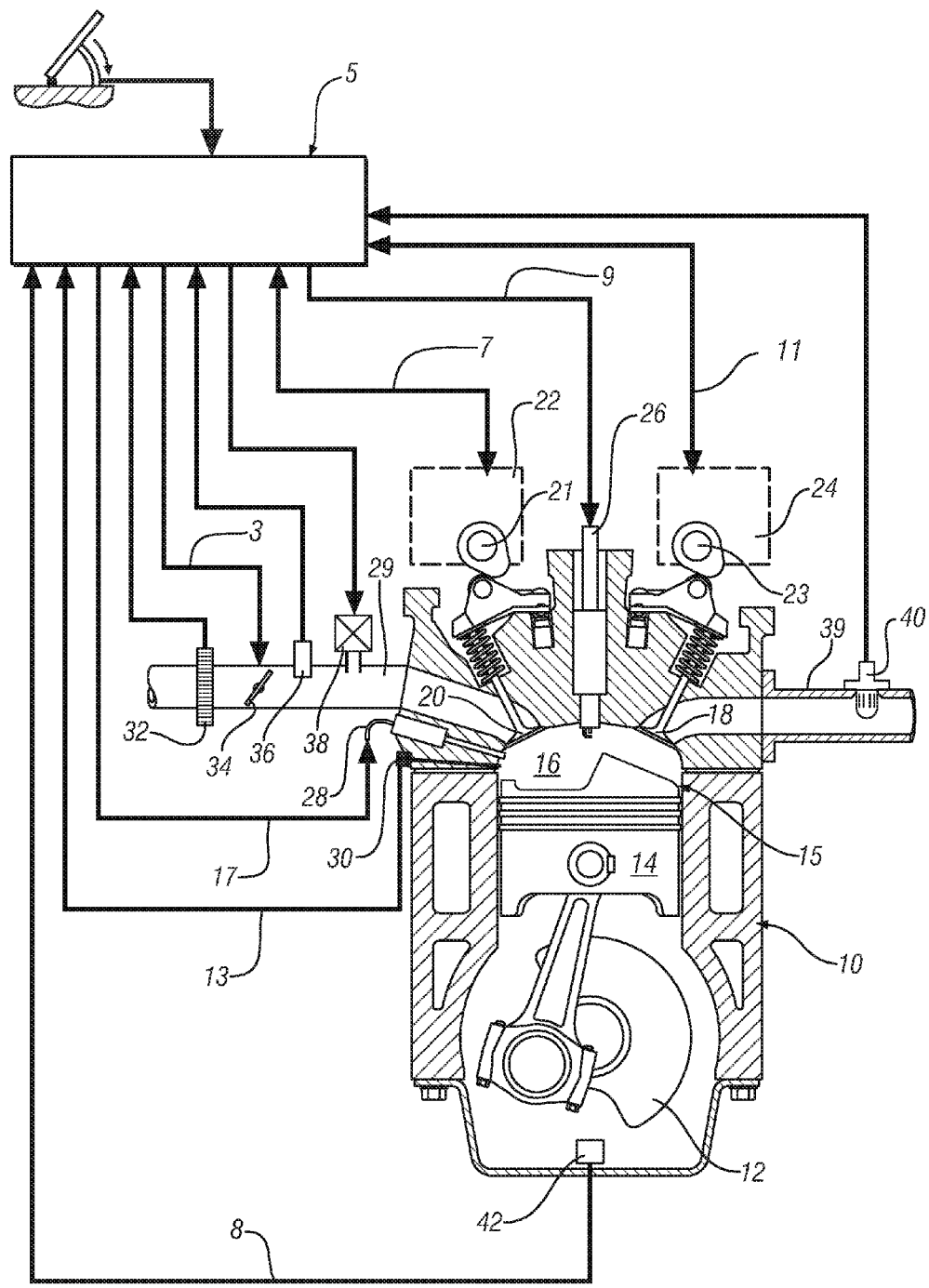
FIG. 1 is a schematic drawing of an exemplary engine system in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode, a homogeneous spark-ignition (SI-H) combustion mode, and a stratified-charge spark-ignition (SI-SC) combustion mode. The engine 10 is selectively operative at a stoichiometric air/fuel ratio and at an air/fuel ratio that is primarily lean of stoichiometry. It is appreciated that the concepts in the disclosure can be applied to other internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal 3 from the control module 5. An MAP sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal 7 from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal 11 from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal 17 from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal 9 from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, processor and similar terms mean any suitable one or various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal,) to determine a torque request (To_req). It will be appreciated that the torque request can be in response to an operator input (e.g., via the accelerator pedal and the brake pedal) or the torque request can be in response to an auto start condition monitored by the control module. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 16 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean air/fuel ratio. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of cylinder air charge. The intake and exhaust valves 20 and 18 are in the low-lift valve position and the intake and exhaust lift timing operate with NVO. One or more fuel injection events can be executed during an engine cycle including at least one fuel injection event during a compression phase.

During engine operation in the homogeneous spark-ignition (SI-H) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

The stratified-charge spark-ignition (SI-SC) combustion mode includes operating substantially lean of stoichiometry. Fuel injection timing is preferably close in time to the spark ignition timing to prevent the air/fuel mixture from homogenizing into a uniformly dispersed mixture. The injected fuel mass is injected in the combustion chamber 16 with rich layers around the spark plug and leaner air/fuel ratio areas further out at the time of spark ignition. A first fuel injection event can end as the spark event begins or immediately prior thereto.

Figure 2:
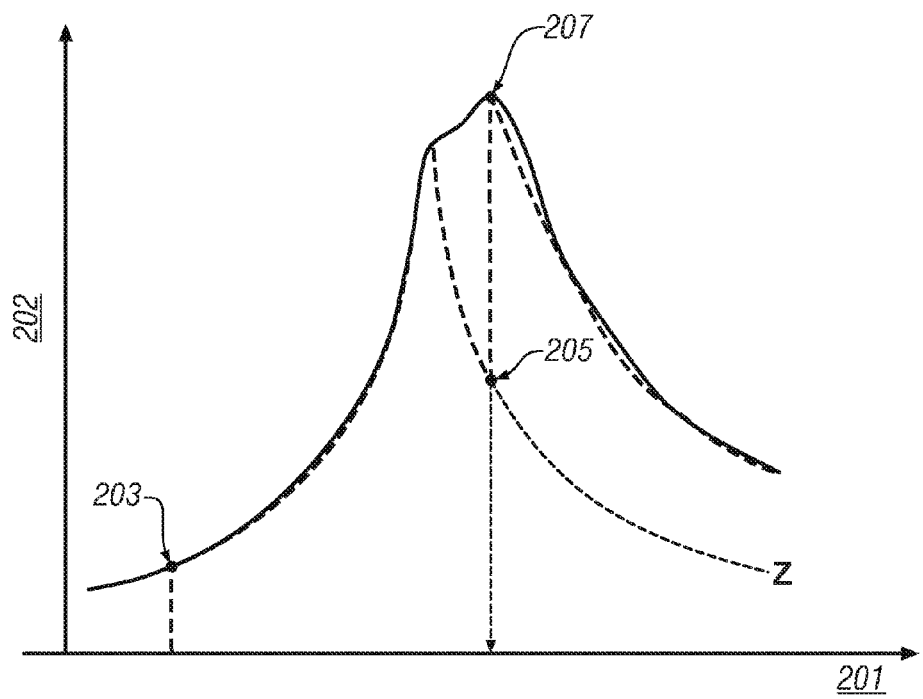
FIG. 2 graphically illustrates an approximation of in-cylinder temperature for an exemplary internal combustion engine as a function of crank angle based upon a constant-volume ideal combustion cycle model in accordance with the present disclosure.

Referring now to FIG. 2, a graph illustrating an approximation of in-cylinder temperature for an exemplary internal combustion engine is depicted as a function of crank angle, based upon a constant-volume ideal combustion cycle model. The axis of abscissa represents the crank angle 201, $\theta$, and the axis of ordinate represents the temperature 202. Broken line Z represents motoring pressure through the combustion cycle. Relevant temperatures and other parameters include the following:

$T_{IVC}$: temperature at intake valve closing, located at point 203;
$T_{SOC}$: temperature at start of combustion, located at point 205;
$T_{EOC}$: temperature at end of combustion, denoted at point 207;
$P_{IVC}$: pressure at intake valve closing, located at point 203;
$P_i$: intake manifold pressure; measurable with the MAP sensor 36 and substantially equal to the $P_{IVC}$, located at point 203;
$P_{SOC}$: pressure at start of combustion, located at point 205;
$P_{max}$: peak cylinder pressure, measurable with the combustion pressure sensor 30 and located at point 207;
$V_{IVC}$: cylinder volume at intake valve closing, located at point 203 on the graph and determined using known slider equations and inputs from the crankshaft and camshaft position sensors;
$V_{LPP}$: cylinder volume at location of peak pressure located at point 207 on the graph and determined using known slider equations and inputs from the crankshaft and camshaft position sensors;
$\theta_{IVC}$: crank angle at intake valve closing, denoted by broken line extending vertically from point 203 to the axis of abscissa;
$\theta_{LPP}$: crank angle at location of peak pressure, denoted by broken line extending vertically from point 207 through point 205 to the axis of abscissa and measurable using the crankshaft position sensor 42, in conjunction with the cylinder pressure sensor 30;
$Q_{LHV}$: low heating value of fuel;
$m_f$: fuel mass;
R: the gas constant;
$\gamma$: specific heat ratio; and
$C_v$: specific heat at constant volume.

Specific parameters are calculated or estimated, as follows:
$T_{SOC} = T_{IVC} \cdot r^{\gamma-1}$, located at point 205;
$r = V_{IVC}/V_{LPP}$, volume ratio located at point 205;

$T_{EOC}(r^{\gamma-1}+\delta)T_{IVC} = T_{SOC}+\delta T_{IVC}$, located at point 207; and $$\delta = \frac{(Q_{LHV} \cdot R \cdot m_f)}{(C_v \cdot P_{IVC} \cdot V_{IVC})} = \frac{(T_{EOC} - T_{SOC})}{T_{IVC}},$$

located at point 207.

The temperatures include approximated cylinder charge temperatures over an engine cycle calculated from a known constant-volume ideal combustion cycle model. The model assumes instantaneous combustion, and is suitable to describe auto-ignited combustion, which normally has much faster fuel burning rate than conventional spark-ignited combustion. The combustion parameter $\delta$ includes instantaneous heat release due to the combustion, normalized by the temperature at intake valve closing, $T_{IVC}$.

The combustion parameter $\delta$ is determined by executing code, including one or more algorithms, in the control module 5, preferably during each engine cycle. The combustion parameter $\delta$ is relatively simple to calculate, thus, does not require expensive signal processing and data analysis hardware for monitoring cylinder pressure. Peak cylinder pressure, $P_{max}$, and the corresponding crankshaft rotational location of the peak cylinder pressure, $\theta_{LPP}$, are measured using the combustion pressure sensor 30 and the crankshaft sensor 42. The intake valve closing, $\theta_{IVC}$ is determined, as described above, using the feedback from the intake cam device 22.

Once the intake valve closes, the mass of air trapped in the cylinder remains the same until the exhaust valve opens. Thus, one can derive a relation using the ideal gas law, as follows in Eq. 1 assuming that $P_{IVC}$ is approximately equal to $P_i$.

$$\frac{p_{SOC}}{T_{SOC}} = \frac{p_i r^\gamma}{T_{IVC} r^{\gamma-1}} = \frac{p_{max}}{T_{EOC}} = \frac{p_{max}}{T_{IVC}(r^{\gamma-1}+\delta)} \quad [1]$$

A combustion parameter $\delta$ including normalized instantaneous heat release is calculated using Eq. 2 as follows.

$$\delta = \frac{p_{max}}{rp_i} - r^{\gamma-1} = \frac{V_{LPP} p_{max}}{V_{IVC} p_i} - \left(\frac{V_{IVC}}{V_{LPP}}\right)^{\gamma-1} \quad [2]$$

Here, the specific heat ratio $\gamma$ is assumed to be constant over an entire engine cycle. As demonstrated in Eq. 2, the combustion parameter $\delta$ is readily calculated by executing a control scheme in real-time once the peak cylinder pressure, $P_{max}$, the cylinder pressure at intake valve closing, $P_{IVC}$, and the locations of the peak cylinder pressure, $\theta_{LPP}$, and associated cylinder volume, $V_{LPP}$, the location of intake valve closing, $\theta_{IVC}$, and associated cylinder volume, $V_{IVC}$, are detected or determined.

Figure 3:
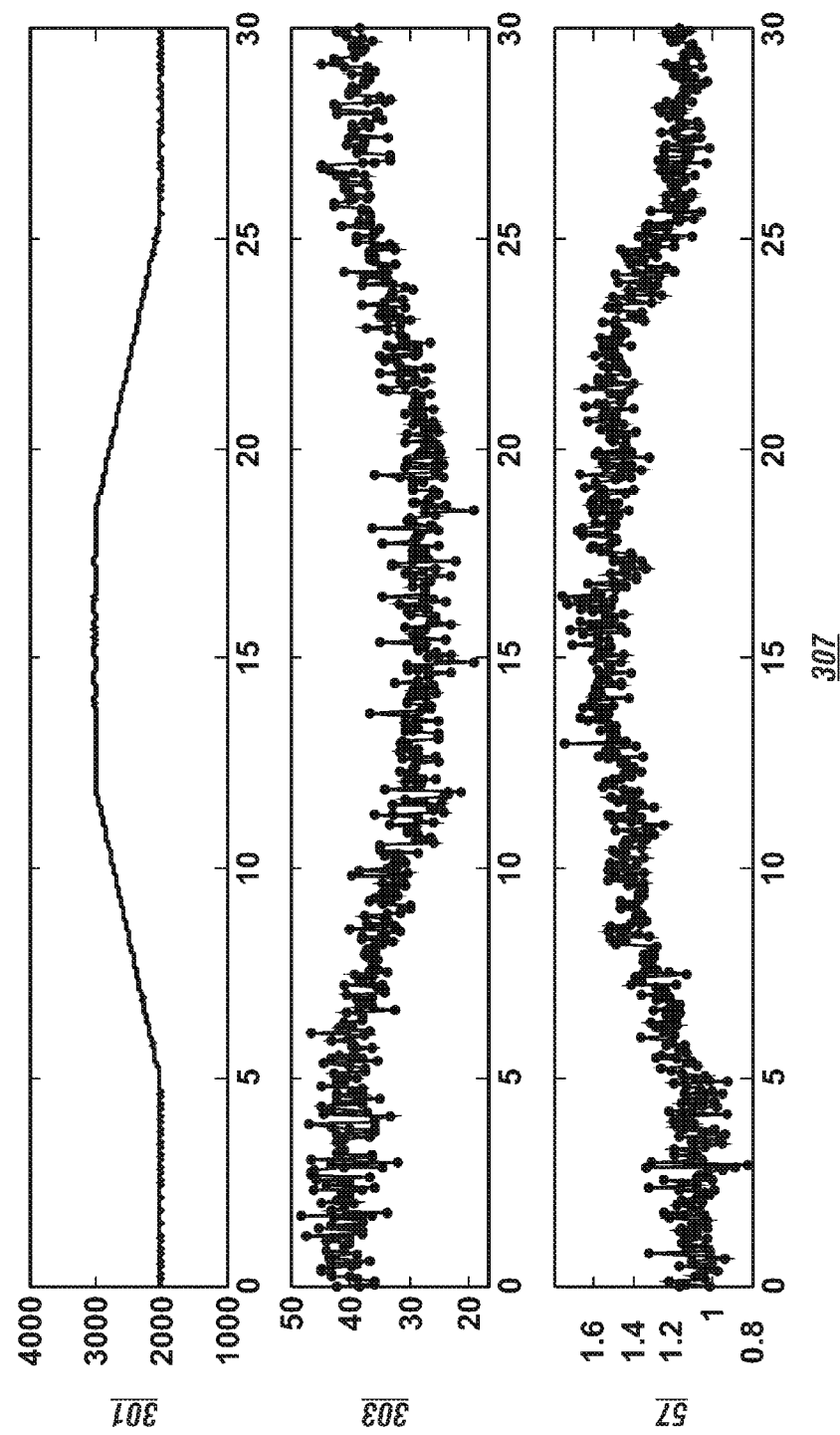
FIG. 3 depicts experimental and derived data from an exemplary engine, depicting CA50 (i.e., crank angle location of 50% fuel mass burn), and combustion parameter calculated from the experimental data in accordance with the present disclosure.

FIG. 3 illustrates experimental and derived data from an exemplary engine, depicting CA50 (i.e., crank angle location after top dead center of 50% fuel mass burn) denoted by axis of ordinate 303, engine speed measured in RPM denoted by axis of ordinate 301 and combustion parameter $\delta$ calculated from the experimental data and denoted by axis of ordinate 57. The axis of abscissa 307 represents time in seconds. The exemplary engine was operated with fixed fueling rate of 7 mg/cycle with engine speed changing between 2000 rpm and 3000 rpm. The results indicate that the state of the CA50 parameter advances as engine speed increases. It is appreciated that the advance in combustion phasing indicated by the state of the CA50 parameter results from the fueling rate per time increasing with increasing engine speed, thus increasing cylinder wall temperature and as a result, fuel burning rate. The response of the combustion phasing is reflected in the combustion parameter δ; to wit, as the combustion phasing advances, the combustion parameter δ increases since instantaneous heat release increases due to fast burning fuel. This indicates that the normalized instantaneous heat release, i.e. the combustion parameter δ has a strong correlation with combustion phasing, and thus useable for controlling combustion phasing of an engine operating in the auto-ignition mode, e.g., HCCI combustion control.

In accordance with the present disclosure, a system architecture that makes the real-time calculation of the combustion parameter δ possible without overloading a central processing unit (CPU) of the control module is described. Two embodiments of system architectures are depicted with reference to FIG. 1. Signals 13 and 8 output from the cylinder pressure sensor 30 and the crankshaft sensor 42, respectively, are the inputs. An Analog Peak Detector Circuit captures a maximum value of the analog signal ($P_{max}$) input from cylinder pressure sensor 30. Use of an analog circuit to detect peak pressure value is advantageous in that the CPU and its analog/digital converter (ADC) are not burdened in collecting and storing cylinder pressure signals at high crank angle resolution. However, in order to calculate the combustion parameter δ, a location of peak pressure is needed. An All-pass Filter and Analog Comparator Circuit (for example, a dual input comparator) are used to inform the CPU and peripherals responsible for engine position determination about crankshaft position location of the peak pressure. The function of the All-Pass Filter is to delay the peak cylinder pressure measurement without distorting it. The Analog Comparator Circuit continuously monitors the pressure signal to determine when it is less than the maximum value of the pressure signal that is delayed through the all-pass filter. When the delayed maximum cylinder pressure signal is greater than the cylinder pressure signal, the maximum of the pressure signal is detected and the comparator toggles its digital output. The toggled signal at the output of comparator triggers the peripheral in the CPU that is responsible for engine position determination. Upon receiving the trigger signal, the peripheral captures the engine position and stores it as the value of location of peak pressure (LPP). When the related task in the CPU software calculates the normalized instantaneous heat release, it reads LPP parameter and commands the ADC peripheral to convert the analog signal at the output of analog peak detector circuit into a digital signal. Since $V_{IVC}$ and $P_{IVC}$ can also be easily calculated and measured, respectively, once the peak pressure conversion is complete, the software executes Eq. 2 in algorithmic form. In order to detect the LPP and $P_{max}$ of the next cycle, the software resets the analog peak detector circuit. Moreover, software can compensate the error introduced to the LPP as the result of known delays in the comparator and/or digital filter using the crankshaft measurement.

Figure 4:
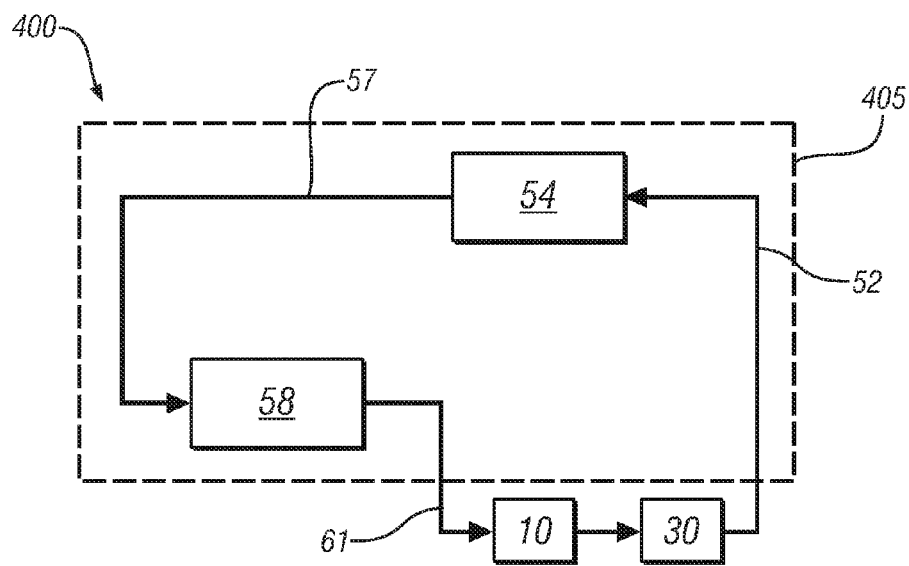
FIG. 4 schematically illustrates a combustion balancing system in accordance with the present disclosure.

Referring now to FIG. 4, a combustion balancing system 400 is illustrated in accordance with an exemplary embodiment of the present disclosure. As will become apparent, the combustion balancing system 400 provides on-board estimation of a combustion parameter δ in each cylinder, where the combustion parameter δ is utilized for real-time combustion balancing control and diagnostics during a combustion cycle. As aforementioned, the combustion parameter δ includes instantaneous heat release due to a combustion event. The combustion balancing system 400 includes a balancing module 405, the engine 10, the combustion sensor 30, an in-cylinder pressure processing unit 54 and a combustion parameter balancing unit 58. It is further appreciated that the balancing module 405 may be incorporated within the control module 5.

Referring to FIGS. 1 and 4, the balancing module 405 controls the aforementioned actuators to form compensated combustion control parameters 61 to the engine 10. As will be discussed in greater detail with reference to FIG. 5, the compensated combustion control parameters 61 are based upon unmodified combustion control parameters and adjustments to combustion control parameters. The compensated combustion control parameters 61 can include fuel injection timing, split fuel injection events and injected fuel mass operative for the appropriate engine speed and load of the engine 10, while maintaining target combustion parameter δ levels in each respective cylinder for real-time combustion balancing control and diagnostics during a combustion cycle. In an exemplary embodiment of the present disclosure, the peak cylinder pressure, $P_{max}$ 52, is measured by the combustion sensor 30. Thereafter, the $P_{max}$ 52 is monitored by the balancing module 405, wherein the $P_{max}$ 52 is processed by the in-cylinder pressure processing unit 54 in association with other parameters to calculate the combustion parameter δ 57 in each cylinder. The other parameters utilized in association with the $P_{max}$ 52 to calculate the combustion parameter δ 57 include the intake manifold pressure, $P_i$, the cylinder volume at intake valve closing, $V_{IVC}$, and the cylinder volume at the location of peak pressure, $V_{LPP}$. As aforementioned, the combustion parameter δ 57 can be calculated utilizing Eq. 2. Thereafter, the combustion parameter δ 57 for each cylinder is input to a combustion parameter balancing unit 58, wherein the combustion parameter balancing unit 58 includes a cylinder balancing strategy to balance the combustion parameter δ 57 in each respective cylinder for combustion of an immediately subsequent engine cycle. Specifically, the combustion parameter δ 57 for each respective cylinder is balanced by the cylinder balancing strategy within the combustion parameter balancing unit 58 by adjusting unmodified combustion control parameters to generate compensated combustion control parameters 61 to be input to the engine 10 for combustion of the subsequent engine cycle. The balancing of the combustion parameter δ 57 for each respective cylinder can be balanced according to a target combustion parameter to be maintained in each cylinder during a combustion cycle. As discussed above, the compensated combustion control parameters 61 can include fuel injection timing, split fuel injection events and injected fuel mass. It is appreciated that adjustments can be made to unmodified combustion control parameters in each cylinder on an individual basis for a subsequent engine cycle to thereby balance the combustion parameters δ (i.e., instantaneous heat releases) in the multi-cylinder engine 10 in real-time.

Figure 5:
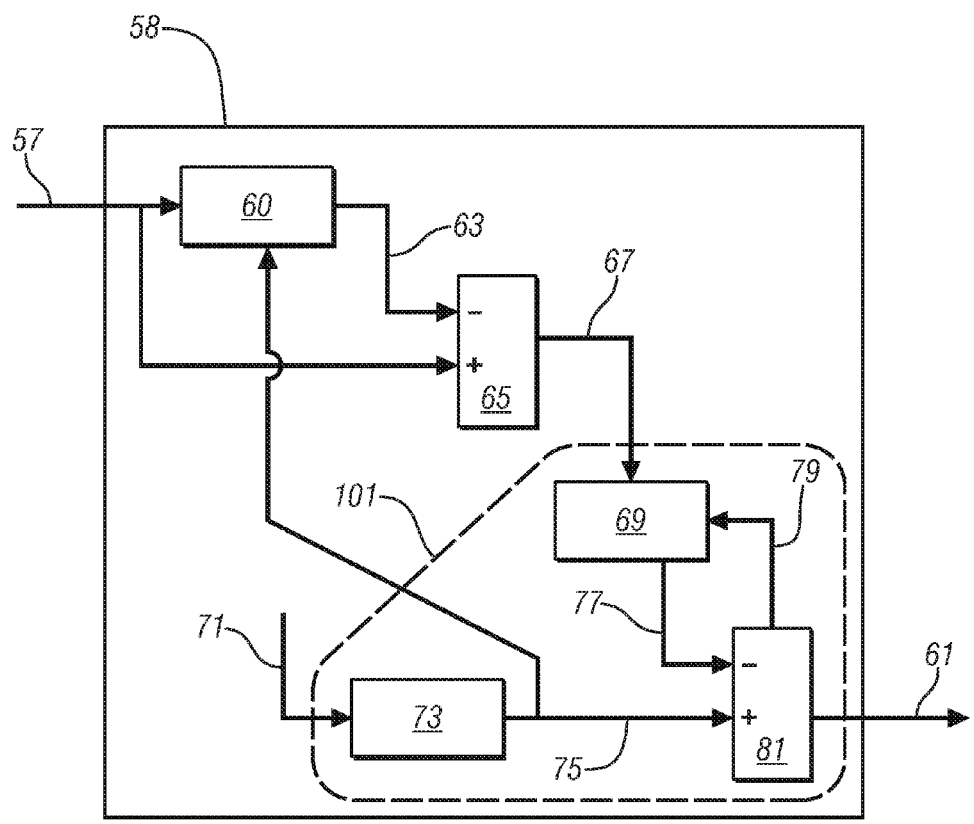
FIG. 5 schematically illustrates the combustion parameter balancing unit 58 of FIG. 4 in accordance with the present disclosure.

Referring now to FIG. 5, the combustion parameter balancing unit 58 of FIG. 4 including the cylinder balancing strategy 101 to adjust the unmodified combustion control parameters 75 in the respective cylinders on an individual basis to thereby balance the combustion parameters δ 57 in each respective cylinder of the multi-cylinder engine 10 is discussed in further detail in accordance with the present disclosure. The balancing unit 58 includes a target combustion parameters unit 60, a first differencing unit 65 and the cylinder balancing strategy 101, wherein the cylinder balancing strategy 101 further includes a balancing parameter feedback unit 69, a calibration unit 73, and a second differencing unit 81. The combustion parameter δ 57 calculated by the in-cylinder pressure processing unit 54 is input to the target combustion parameter unit 60 and the first differencing unit 65. As aforementioned, the combustion parameter δ 57 can correspond to instantaneous heat release of a combustion cycle. The target combustion parameter unit 60 determines operating point dependent combustion parameter targets for combustion based upon the unmodified combustion control parameters 75 and the combustion parameters δ 57 in each of the cylinders. A target combustion parameter 63, generated by the target combustion parameter unit 60, is input to the first differencing unit 65 and compared with the combustion parameter δ 57. The target combustion parameter 63 can include an ideal combustion parameter operative for the appropriate engine speed and load of the engine 10 for providing robust auto-ignition, providing residual heat sufficient for auto-ignition in subsequent engine cycles or maintaining desired NOx emission levels initiated by flame propagation when spark ignition is utilized. Based on the comparing between the combustion parameter δ 57 and the target combustion parameter 63, a combustion parameter compared 67 is input to the balancing combustion parameter feedback unit 69 of the cylinder balancing strategy 101. Based upon the combustion parameter compared 67 and saturation feedback 79, the balancing combustion parameter feedback unit 69 generates adjustments to combustion control parameters 77. For each cylinder, the adjustments to combustion control parameters 77 are subtracted from the unmodified combustion control parameters 75 in the second differencing unit 81.

Desired engine inputs 71 including desired engine speed and desired fuel injection strategies are input into the calibration unit 73 of the cylinder balancing strategy 101. It is appreciated that the desired engine inputs can be based upon a torque request, wherein the torque request can include operator inputs to actuators including an accelerator pedal and a brake pedal, as mentioned above. The calibration unit 73 includes a calibration table that generates unmodified combustion control parameters 75. As aforementioned, combustion control parameters can include, fuel injection timing, split fuel injection events and injected fuel mass, wherein the calibration table within the calibration unit 73 can calculate the unmodified combustion control parameters 75 based on the desired engine operation utilizing known methods. As mentioned above, the unmodified combustion control parameters 75 subtract the adjustments to combustion control parameters 77 in the second differencing unit 81. Based upon the difference between the adjustments to combustion control parameters 77 and the unmodified combustion control parameters 75, the compensated combustion control parameters 61 for each respective cylinder are generated and thereby input to the multi-cylinder engine 10 during an immediately subsequent engine cycle.

Combustion control parameters are generated in response to operator inputs to achieve various performance goals. However, cylinder-to-cylinder conditions can vary due to air and EGR mal-distributions in each cylinder, resulting in combustion that is not the same in each cylinder even through the unmodified combustion control parameters 75 for each cylinder are identical. Utilizing the combustion parameter δ 57, based on in-cylinder peak pressure measurements in each cylinder, real-time combustion balancing control and diagnostics during a combustion cycle can be achieved by providing adjustments to combustion control parameters 77 resulting in compensated combustion control parameters 61 to be input to each cylinder on an individual basis, wherein the compensated combustion control parameters 61 provide stable and balanced combustion in each cylinder during an immediately subsequent combustion cycle in real time.

As aforementioned, in an HCCI engine with multiple cylinders, combustion timing for each cylinder can vary significantly due to differences in the intake and thermal boundary conditions of each cylinder. Combustion control parameters such as NVO, throttle, and EGR valve positions have a global effect on combustion phasing for all cylinders, therefore, such combustion control parameters cannot be used for individual combustion phasing control. The exemplary combustion balancing system 400 allows combustion control parameters such as fuel injection timing, split fuel injection events and injected fuel mass to be adjusted and compensated to balance individual instantaneous heat releases (i.e., combustion parameter 6) in each of the respective cylinders.

It is appreciated that fuel injection strategies can stabilize and provide robust combustion in cylinders on an individual basis. When the engine is operating during a low load and low engine speed, the temperature of the cylinder charge can be increased by pre-injecting fuel into the combustion chamber, preferably during the NVO period. Specifically, a split fuel injection event can be utilized in respective cylinders to substantially achieve the target combustion parameter in each respective cylinder. When the engine is operating in auto-ignition (HCCI), the split fuel injection event includes delivering a first injection early in a compression stroke of a first portion of a fixed fuel mass and a second injection near top dead center of the compression stroke of a remaining minority of the fixed fuel mass. The first portion of the fixed fuel mass reforms due to pressure and temperature during recompression and resulting in releasing heat energy and increasing the cylinder charge temperature. The cylinder charge having increased temperature auto-ignites from the second injection near top dead center of the compression stroke of the remaining minority portion of the fixed fuel mass. It will be appreciated that the fixed fuel mass includes a fuel mass sufficient to provide residual heat adequate for generating a combustion parameter during an immediately subsequent engine cycle to substantially achieve the target combustion parameter.

When stratified-charge spark-ignition (SI-SC) combustion is being utilized, split fuel injection includes delivering the first injection early in the compression stroke of the first portion of the fixed fuel mass and the second injection near top dead center of the compression stroke of the remaining minority of the fixed fuel mass. The first portion of the fixed fuel mass reforms due to pressure and temperature during recompression and resulting in releasing heat energy and increasing the cylinder charge temperature. The second injection is delivered prior to and coincident with spark plug ignition to initiate flame propagation.

Adjustments to combustion control parameters 77 resulting in compensated combustion control parameters 61 can further include adjusting fuel injection timing to respective cylinders to control fuel reforming within a respective cylinder to substantially achieve the target combustion parameter 63. Adjusting the fuel injection timing to respective cylinders can include delivering a single injection of a fuel mass early in the compression stroke to increase the combustion parameter in an immediately subsequent engine cycle to achieve the target combustion parameter or deliver a single injection of a fuel mass later in the compression stroke to decrease the combustion parameter in an immediately subsequent engine cycle to achieve the target combustion parameter. The fuel mass is subsequently auto-ignited after the single injection event.

Adjustments to combustion control parameters 77 resulting in compensated combustion control parameters 61 can further include adjusting injected fuel mass to respective cylinders on an individual basis. The quantity of the fuel mass is selected as a fuel mass sufficient when combusted within a respective cylinder to substantially achieve the target combustion parameter.

Engines operating in an HCCI combustion mode are scheduled based on engine speed and load, wherein the compensated combustion control parameters 61 vary according to the engine speed and load at which the engine is operating. Therefore, in-cylinder combustion pressure will vary according to the engine speed and load. Utilizing the in-cylinder pressure processing unit 54 to estimate the combustion parameter δ 57 enables real-time onboard estimation of the combustion parameter δ 57 in each respective cylinder for each combustion cycle based upon measured in-cylinder pressure traces in each respective cylinder from each cycle, where the combustion parameter δ 57 is utilized for real-time combustion balancing control and diagnostics during a combustion cycle.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling combustion in a multi-cylinder internal combustion engine operating in a controlled auto-ignition mode, comprising:
   determining a respective peak cylinder pressure and a respective crank angle location of the peak cylinder pressure for each cylinder during each combustion cycle;
   determining a respective cylinder volume at the respective crank angle location of the peak cylinder pressure for each cylinder during each combustion cycle;
   determining a respective cylinder pressure at a respective intake valve closing for each cylinder during each combustion cycle;
   determining a respective cylinder volume at the respective intake valve closing for each cylinder during each combustion cycle;
   calculating an instantaneous combustion parameter for each cylinder based upon the respective peak cylinder pressure, the respective cylinder pressure at the respective intake valve closing, the respective crank angle location of the respective peak cylinder pressure, the respective cylinder volume at the respective crank angle location of the peak cylinder pressure, and the respective cylinder volume at the respective intake valve closing;
   providing unmodified combustion control parameters which are identical in each cylinder;
   determining a target combustion parameter to be maintained in each cylinder based upon the provided unmodified combustion control parameters and the calculated instantaneous combustion parameters for each cylinder, wherein the unmodified combustion control parameters provided for determining the target combustion parameter correspond to a combustion cycle immediately subsequent to a present combustion cycle at which the instantaneous combustion parameters are calculated for determining the target combustion parameter;
   comparing the calculated instantaneous combustion parameter for each cylinder in the present combustion cycle to the target combustion parameter;
   individually adjusting the provided unmodified combustion control parameters in each respective cylinder to balance the calculated instantaneous combustion parameter across all cylinders in the immediately subsequent combustion cycle based on the comparing, wherein the individually adjusted provided unmodified combustion control parameters in each respective cylinder only affects the calculated instantaneous combustion parameter for the respective cylinder being adjusted; and
   controlling the engine during the immediately subsequent engine cycle based on the individually adjusted provided combustion control parameters.

2. The method of claim 1 wherein the calculated instantaneous combustion parameter correlates to an instantaneous heat release of a cylinder charge.

3. The method of claim 1, wherein calculating the instantaneous combustion parameter is further based upon a specific heat ratio for a cylinder charge.

4. The method of claim 1, wherein independently adjusting the provided unmodified combustion control parameters in each respective cylinder to balance the combustion parameter across all cylinders based on the comparing comprises:
   monitoring a torque request;
   determining the unmodified combustion control parameters based upon the torque request;
   individually determining respective adjustments to the unmodified combustion control parameters in each respective cylinder based upon the comparison of the calculated combustion parameter for each cylinder to the target combustion parameter;
   comparing the respective adjustments to the unmodified combustion control parameters in each respective cylinder and the unmodified combustion control parameters; and
   generating compensated combustion control parameters for each respective cylinder during the immediately subsequent engine cycle based upon the comparing.

5. The method of claim 4, wherein monitoring the torque request comprises monitoring at least one of an accelerator pedal and a brake pedal.

6. Method for controlling combustion in a multi-cylinder internal combustion engine operating in a controlled auto-ignition mode, comprising:
   determining a respective peak cylinder pressure and a respective crank angle location of the peak cylinder pressure for each cylinder during each combustion cycle;
   determining a respective cylinder volume at the respective crank angle location of the peak cylinder pressure for each cylinder during each combustion cycle;
   determining a respective cylinder pressure at a respective intake valve closing for each cylinder during each combustion cycle;
   determining a respective cylinder volume at the respective intake valve closing for each cylinder during each combustion cycle;
   calculating an instantaneous heat release for each cylinder based upon the respective peak cylinder pressure, the respective cylinder pressure at the respective intake valve closing, the respective crank angle location of the respective peak cylinder pressure, the respective cylinder volume at the respective crank angle location of the peak cylinder pressure, and the respective cylinder volume at the respective intake valve closing;
   providing unmodified combustion control parameters which are identical in each cylinder in response to a torque request;
   determining a target heat release to be maintained in each cylinder based upon the provided unmodified combustion control parameters and the instantaneous heat release for each cylinder, wherein the unmodified combustion control parameters provided for determining the target heat release correspond to a combustion cycle immediately subsequent to a present combustion cycle at which the instantaneous heat release is calculated for determining the target heat release;

individually adjusting the unmodified combustion control parameters in each respective cylinder based on a difference between the instantaneous heat release and the target heat release, wherein the individually adjusted unmodified provided combustion control parameters in each respective cylinder only affects the instantaneous heat release for the respective cylinder being adjusted during the immediately subsequent combustion cycle; and controlling the engine based on the individually adjusted combustion control parameters.

7. The method of claim 6, wherein calculating the instantaneous heat release is further based upon a specific heat ratio for a cylinder charge.

8. The method of claim 6, wherein unmodified combustion control parameters comprise a fuel injection timing.

9. The method of claim 6, wherein unmodified combustion control parameters comprise a fuel injection mass.

10. The method of claim 8 wherein individually adjusting the unmodified combustion control parameters in each respective cylinder comprising the fuel injection timing comprises one of a) delivering a single injection of the fuel mass earlier in a compression stroke to increase the heat release in the immediately subsequent engine cycle to achieve the target heat release and b) delivering a single injection of the fuel mass later in the compression stroke to decrease the heat release in the immediately subsequent engine cycle to achieve the target combustion parameter.

11. The method of claim 6 wherein individually adjusting the unmodified combustion control parameters comprises:
delivering a first injection of a majority of a total fuel mass early in a compression stroke; and
delivering a second injection of the remainder of the total fuel mass near top dead center of the compression stroke.

12. The method of claim 11 further comprising providing a spark ignition of the second injection of the remainder of the total fuel mass.

13. Apparatus for controlling a multi-cylinder spark-ignition direct-injection internal combustion engine, comprising:
a pressure sensor for monitoring in-cylinder pressure;
a crank sensor for monitoring crank angle;
a control module:
determining a respective peak cylinder pressure and a respective crank angle location of the peak cylinder pressure for each cylinder during each combustion cycle;
determining a respective cylinder volume at the respective crank angle location of the peak cylinder pressure for each cylinder during each combustion cycle;
determining a respective cylinder pressure at a respective intake valve closing for each cylinder during each combustion cycle;
determining a respective cylinder volume at the respective intake valve closing for each cylinder during each combustion cycle;
providing combustion control parameters which are identical for each cylinder;
calculating an instantaneous combustion parameter for each cylinder based upon the respective peak cylinder pressure, the respective cylinder pressure at the respective intake valve closing, the respective crank angle location of the respective peak cylinder pressure, the respective cylinder volume at the respective crank angle location of the peak cylinder pressure, and the respective cylinder volume at the respective intake valve closing;
determining a target combustion parameter to be maintained in each cylinder based upon the provided unmodified combustion control parameters and the calculated instantaneous combustion parameters for each cylinder, wherein the unmodified combustion control parameters provided for determining the target combustion parameter correspond to a combustion cycle immediately subsequent to a present combustion cycle at which the instantaneous combustion parameter is calculated for determining the target combustion parameter;
comparing the calculated instantaneous combustion parameter for each cylinder in the present combustion cycle to the target combustion parameter;
individually adjusting the provided unmodified combustion control parameters in each respective cylinder to balance the calculated instantaneous combustion parameter across all cylinders in the immediately subsequent combustion cycle based on the comparing, wherein the individually adjusted provided combustion control parameters in each respective cylinder only affects the calculated instantaneous combustion parameter for the respective cylinder being adjusted; and
controlling the engine during the immediately subsequent engine cycle based on the individually adjusted provided combustion control parameters.

14. The method of claim 13 wherein the calculated instantaneous combustion parameter correlates to an instantaneous heat release of a cylinder charge.

15. The method of claim 13, wherein calculating the instantaneous combustion parameter is further based upon a specific heat ratio for a cylinder charge.

16. The method of claim 13, wherein individually adjusting the provided unmodified combustion control parameters in each respective cylinder to balance the combustion parameter across all cylinders based on the comparing comprises:
monitoring a torque request;
determining the unmodified combustion control parameters based upon the torque request;
individually determining respective adjustments to the unmodified combustion control parameters in each respective cylinder based upon the comparison of the calculated combustion parameter for each cylinder to the target combustion parameter;
comparing the respective adjustments to the unmodified combustion control parameters in each respective cylinder and the unmodified combustion control parameters; and
generating compensated combustion control parameters for each respective cylinder during the immediately subsequent engine cycle based upon the comparing.

17. The method of claim 16, wherein monitoring the torque request comprises monitoring at least one of an accelerator pedal and a brake pedal.

* * * * *